Aug. 16, 1960 E. J. TRAYNOR, JR 2,949,150
FLEXIBLE BONDED MICA INSULATION
Filed July 16, 1957
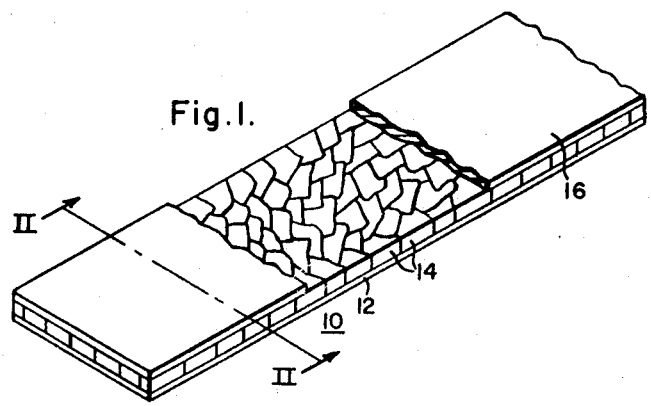
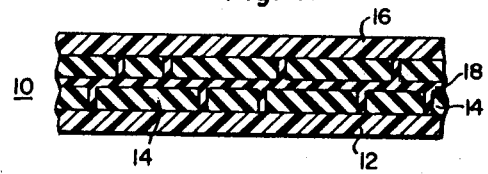
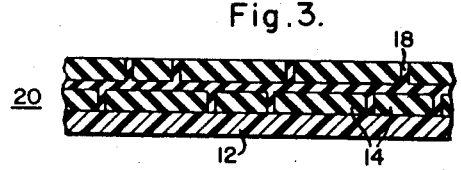
WITNESSES
INVENTOR
Edward J. Traynor, Jr.
BY
ATTORNEY

United States Patent Office 2,949,150
Patented Aug. 16, 1960

2,949,150

FLEXIBLE BONDED MICA INSULATION

Edward J. Traynor, Jr., Monroeville, Pa., assignor to Westinghouse Electric Corporation, East Pittsburgh, Pa., a corporation of Pennsylvania Filed July 16, 1957, Ser. No. 672,289

4 Claims. (Cl. 154—2.6)

This invention relates to insulating compositions, and particularly to flexible laminated insulating compositions suitable for use in electrical apparatus.

In most applications of electrically insulating compositions in sheet or tape form it is imperative that the insulation possess good mechanical and dielectric strengths. It is highly desirable that the insulating compositions be resistant to the deleterious effects of high temperatures, moisture, lubricants, oxidizing substances such as ozone and nitrogen oxides, and solvent vapors such as those of hydrocarbons, ketones and alcohols. It is desirable to have available in the art insulation materials that combine the aforementioned characteristics.

It has proven desirable to combine polytetrafluoroethylene with mica to produce composite insulation having the above-mentioned desirable characteristics. Prior attempts to produce insulation from mica and polytetrafluoroethylene have not proven entirely satisfactory owing to the difficulty of producing a durable bond therebetween.

The object of this invention is to provide flexible composite mica insulation comprising a layer of mica flakes durably bonded to at least one layer of polytetrafluoroethylene, said mica flakes being bonded together and to the layer of polytetrafluoroethylene by a heat resistant organopolysiloxane adhesive material.

Other objects of this invention will, in part, be obvious and will, in part, appear hereinafter.

For a better understanding of the nature and objects of this invention reference should be had to the following detailed description and drawing, in which:

Figure 1 is a view in perspective, partly broken of a sheet of the composite mica tape insulation;

Fig. 2 is a cross section on the line II—II of Fig. 1; and

Fig. 3 is a cross section through a modified form of the composite insulation.

In accordance with this invention, flexible and strong composite mica insulation is prepared by applying to mica flakes a heat-resistant, adhesive material, preparing therefrom a layer of bonded mica flakes, applying to the layer of bonded mica flakes at least one layer of unfused polytetrafluoroethylene, and then fusing the polytetrafluoroethylene and simultaneously bonding it to the mica flakes. Composite mica insulation so prepared possesses sufficient strength that it may be wrapped tightly and firmly about electrical conductors so as to produce a dense and firm insulation thereon. It is quite flexible and can be applied easily by the usual techniques to almost any shape or size of conductor without loss of mica flakes.

The heat-resistant adhesive composition employed in this invention to bond the mica flakes together into a layer also serves to bond the layer of mica flakes to the polytetrafluoroethylene layer. The adhesive composition is one that has good heat resistance up to about 260° C. and good adhesion to polytetrafluoroethylene. Examples of suitable adhesive compositions are the certain organopolysiloxane adhesive materials.

Referring to Figs. 1 and 2 of the drawing, there is illustrated a tape 10 of the composite mica insulation prepared in accordance with the present invention. The tape 10 comprises a pliable sheet 12 of fused polytetrafluoroethylene upon which is applied a layer 14 composed of mica flakes of any suitable size and shape. For many purposes a second layer of pliable sheet 16 of polytetrafluoroethylene is superimposed on the layer of mica flakes. As shown in cross section in Fig. 2 of the drawing, the spaces between the mica flakes contain an adhesive binder 18.

An example of silicone adhesive material that has been successfully employed in carrying out this invention is a stable tacky viscous organopolysiloxane composition comprising (a) 5 to 70 percent by weight of a benzene soluble resin copolymer of $SiO_2$ and $R_3SiO_{1/2}$, where R is an alkyl radical of less than 4 carbon atoms or a phenyl radical, and where the ratio of $R_3SiO_{1/2}$ units to $SiO_2$ units is between 0.6 to 0.9 inclusive, and (b) 95 to 30 percent by weight of a diorganopolysiloxane having the general formula $R'_2SiO$, where R' is methyl or phenyl and having a viscosity of at least 1,000,000 cs. at 25° C. In each of ingredients (a) and (b), at least 90 percent of the total number of R and R' radicals respectively are alkyl.

The resin copolymer (a) can be a two-component copolymer composed essentially of $SiO_2$ and $R_3SiO_{1/2}$ units in the above-defined ratio. Resin (a) may also contain limited amounts of $R_2SiO$ units. In this event, the resin is a three-component copolymer which is composed essentially of $SiO_2$, $R_3SiO_{1/2}$, and $R_2SiO$ units, where R is as above defined. When diorganosiloxane units are present, the ratio of the total amount of $R_3SiO_{1/2}$ units plus $R_2SiO$ units to $SiO_2$ units is from .6 to .9 inclusive. The diorganosiloxane units may be present in resin (a) in amount up to .2 per $SiO_2$ unit.

A highly satisfactory adhesive composition consists of a mixture of (a) and (b) which also contains up to 10 percent by weight of a hydrolyzable titanium compound of the formula $Ti(OR)_4$ or an aliphatic hydrocarbon soluble partial hydrolyzate thereof. In the titanium compounds, R is an aliphatic hydrocarbon radical of less than 20 carbon atoms or a hydroxylated aliphatic hydrocarbon radical of less than 20 carbon atoms. The addition of these titanium esters increases the adhesive strength of the compounds employed as adhesives in this invention.

The diorganopolysiloxane polymers (b) which may be employed in the adhesive are those having viscosities of at least 1,000,000 cs. when measured at 25° C. These polymers may vary from viscous fluids to deformable solids whose viscosity is so high that measurement of the viscosity is meaningless. However, they are uniformly characterized by being soluble in solvents such as benzene, xylene, toluene, and petroleum solvents. These polymers may be dimethylpolysiloxanes or they may be copolymers of dimethylsiloxane with up to 20 mol percent phenylmethylsiloxane or copolymers of dimethylsiloxane with up to 10 mol percent diphenylsiloxane. The preferred polymers are the dimethylpolysiloxanes. It is to be understood that the polymer (b) may contain traces of $RSiO_{3/2}$ and/or $R_3SiO_{1/2}$ units.

The polymers (b) employed in the adhesive composition are readily prepared by any of the known methods for preparing siloxane high polymers such as acid or alkali catalyzed polymerization of the corresponding cyclic siloxanes.

The R groups in the triorganosiloxanes and the diorganosiloxanes of component (a) are alkyl radicals such as methyl, ethyl and propyl or combinations thereof or combinations of any of these alkyl radicals and phenyl radicals. In any event, the total number of phenyl radicals in the siloxanes should be no more than 10 percent of the total number of R groups. Specific examples of siloxanes which may be copolymerized with the SiO₂ are trimethylsiloxane, dimethylsiloxane, phenyldimethylsiloxane, phenylmethylsiloxane, triethylsiloxane, propyldimethylsiloxane, phenylethylsiloxane, and ethylmethylsiloxane.

The resin copolymers (a) may be prepared by cohydrolyzing the corresponding hydrolyzable silanes. The cohydrolysis is best carried out in the presence of a water-miscible solvent such as dioxane. In view of the great reactivity of silicon tetrachloride, less gelation occurs when ethylorthosilicate is employed as one of the reactants. For example, a mixture of ethylorthosilicate, trimethylchlorosilane, and dimethyldichlorosilane may be cohydrolyzed by adding the mixture to a solution of water in dioxane.

A method for preparing the resin copolymers (a) is disclosed in U.S. Patent No. 2,676,182 to Daudt et al. In accordance with Daudt et al., the resins can be prepared by reacting the appropriate organosilane or the appropriate organosiloxane with a silica hydrosol having a pH below 5, there being at least 1 mol of organosilicon compound per mol of SiO₂ in the reaction mixture. When diorganosiloxanes are to be included in resin component (a), it is preferred that the diorganosilicon reactant be added to the hydrosol after addition of the triorganosilicon compound has been completed.

Any combination of components (a) and (b) in the ratios stated above gives excellent adhesives. It has been found that the best adhesives comprise mixtures of about equal percents by weight of components (a) and (b). This is true whether a titanium compound is present or not. For example, the best adhesion is obtained with a composition containing 50 percent by weight of (a) and 50 percent by weight of (b); or, for example, by employing a composition comprising 49 percent by weight of (a), 49 percent by weight of (b), and 2 percent by weight of any of the defined titanium compounds.

As stated above, titanium esters of the formula Ti(OR)₄ may be employed to improve the adhesives employed in this invention. Specific examples of titanium compounds which are operative herein are titanium esters of monohydric alcohols such as tetraisopropyl titanate, tetra (2-ethyl-hexyl) titanate, tetrabutyl titanate, and tetrastearyl titanate; and esters of polyhydric alcohols such as octylene glycolyl titanate and titanates of tetraethylene glycol and glycerine. The titanates of the polyhydric alcohols can be those which contain unreacted hydroxyl groups as well as those in which all of the hydroxyl groups have reacted with the titanium. Partial hydrolyzates of any of the above titanates are operative. The partial hydrolyzates are benzene soluble polyesters which have at least one

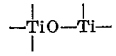

linkage in the molecule.

If desired, catalysts may be mixed with the adhesives. The catalysts hasten the cure of the adhesive and improve the moisture resistance thereof. Suitable catalysts include, for example, organometallic compounds such as alkylzirconates, alkylborates; metal alkoxides such as aluminum, magnesium and calcium alkoxides; and metal salts of carboxylic acids such as zinc octoate, lead-2-ethylhexoate and lead naphthenates; and alkoxy silanes such as ethyl silicate. The catalysts are generally employed in amout from .001 to .5 percent by weight based on the weight of the total adhesive composition. Larger amounts may be employed, if desired.

The adhesive compositions employed in this invention are prepared by merely mixing ingredients (a) and (b) together with, if desired, any of the above additives. It is preferable to mix the ingredients in a mutual solvent to form an adhesive composition. Specific examples of the preparation of adhesive compositions that may be employed in carrying out this invention are given in U.S. Patent No. 2,736,721.

The adhesive composition is applied to mica flakes in any convenient manner such as by dipping the mica flakes in the adhesive composition or by brushing or spraying the adhesive composition on the surfaces of the mica flakes. Suitable solvents which may be employed to form the adhesive composition are benzene, toluene, and petroleum hydrocarbon solvents. The amount of adhesive material which is applied to the surfaces of the mica flakes may be varied. Ordinarily, sufficient adhesive should be applied to render the surfaces of the mica flakes definitely tacky to the touch after the removal of the solvent.

The mica flakes employed in the preparation of the composite insulation of this invention may be either muscovite or phlogopite mica. However, other forms of sheet inorganic insulating materials corresponding to or the equivalent of mica, both natural and artificial or synthetic may be employed. The size of the mica flakes is selected in accordance with the application. For the highest grade electrical insulation, the mica flakes should be of a size of approximately 1 inch diameter and greater. However, as well understood by those skilled in the art, mica splittings or flakes are of extremely random and variable size even when classified closely, and mixtures averaging 1 inch in diameter but admixed with significant amounts of smaller flakes have been used successfully. The average diameter of the mica flakes should exceed ¼ inch to produce useful products.

The mica insulation of the present invention may be prepared by hand or in a conventional mica laying machine. Good results have been secured by employing a mica laying machine, wherein a sheet of the polytetrafluoroethylene base material passes below a mica dropping tower that applies a thickness of two or three mica flakes on the average on the surface of the sheet, with some manual inspection and patching to fill in any thin or uncovered spots on the base sheet. A solution of the adhesive composition dissolved in a suitable solvent to provide solutions of a viscosity of about 10 poises and less having from 5% to 90% by weight of the organosiloxane adhesive composition therein is dripped upon the mica flakes in a quantity sufficient to wet them. The wetted mica layer is rolled to spread the solution of the adhesive between the mica flakes and the sheet of polytetrafluoroethylene. Additional layers of mica flakes may be applied as required. I have found that a layer of mica applied in this manner is adequate for the preparation of flexible mica tape for use in high-voltage electrical machinery. Finally, a top sheet 16 of polytetrafluoroethylene is applied, and the insulation is rolled lightly to cause the binder to spread throughout the mica flake layer 14 and to wet the sheets 12 and 16 of polytetrafluoroethylene. The composite insulation is then heated to evaporate the volatile solvent, leaving substantially only the liquid resinous binder.

The layer of polytetrafluoroethylene that forms the backing or supporting material for the composite insulation of this invention may be applied to just one or to both sides of the bonded mica layers and can be applied in sheet form or in the form of finely divided powder.

If the finely divided polytetrafluoroethylene powder is employed, it can be applied to the bonded mica layer in dry form by dusting, spraying or the like, or in the form of a water emulsion by dipping, spraying or the like.

After the application of the polytetrafluoroethylene layer to the bonded mica layer and the removal of the solvent from the adhesive, the assembly is subjected to a temperature of from between about 370° C. to 430° C.

in order to fuse the polytetrafluoroethylene and produce a unitary laminated sheet that is hard and flexible. Pressure may be applied during the application of the heat if desired.

For some purposes, it is not necessary to employ the polytetrafluoroethylene on more than one side of the formed mica layer, as illustrated in Fig. 3 of the drawing. The composite insulation 20 shown in this figure comprises only one layer 12 of the polytetrafluoroethylene upon which is applied the mica flakes 14 and the binder 18.

The following example illustrates one method of preparing the mica insulation of this invention.

*Example I*

Mica flakes about one inch in diameter were dipped into a solution comprising 80 parts by weight of toluene and 20 parts by weight of a silicone adhesive consisting of 50 parts by weight of an organosiloxane copolymer composed of $(CH_3)_3SiO_{1/2}$ units and $SiO_2$ units, having about 1.2 methyl units per silicon atom in the copolymer and 50 parts by weight of a dimethylsiloxane having a viscosity of 10,000,000 centistokes at 25° C.

The dipped mica flakes were air dried and laid into sheet form with each flake overlapping the adjacent one by about ¼ inch. The sheet was then heated to a temperature of about 150° for five minutes to remove the toluene. A water emulsion of finely divided polytetrafluoroethylene was then applied to the formed mica sheet to provide on each side thereof a layer of polytetrafluoroethylene of a thickness of about 1 mil. The mica layer with the applied polytetrafluoroethylene was air dried to remove substantially all the water. The prepared assembly was then subbjected to a temperature about 371° C. for a period of about five minutes in an air circulating oven to fuse the polytetrafluoroethylene and and to render it impervious. A unitary flexible laminated insulating member was formed that had a dielectric strength of 1367 volts per mil.

The insulation of this invention may be employed in many applications where natural sheet or built-up mica is now employed. For example, it can be used to make V-rings, coil forms, spacers, supports, bases and the like.

The composite insulation of this invention has particular application in electric motors adapted for operation when submerged in water. Heretofore, it has been necessary to hermetically seal the motor windings of such motors to protect the windings from high temperature, high pressure water to which the motor is subjected during operation. By employing the composite insulation of this invention, motors can be prepared that will withstand for a considerable period of time water pressures up to about 2000 p.s.i. and heat up to 230° C. without the necessity of hermetically sealing the motor windings.

Since certain changes in carrying out the above procedures and in the product embodying the invention may be made without departing from its scope, it is intended that the accompanying description and drawing be interpreted as illustrative and not in a limiting sense.

I claim as my invention:

1. A flexible electrically insulating material comprising two superimposed layers of polytetrafluoroethylene, a layer of mica flakes disposed between the two layers of polytetrafluoroethylene, and a flexible bonding agent comprising a polysiloxane material composed essentially of (a) from 5% to 70% by weight of a benzene soluble resin copolymer composed essentially of structural units of $SiO_2$ and $R_3SiO_{1/2}$ where R is a monovalent hydrocarbon selected from the group consisting of alkyl radicals of less than 4 carbon atoms and phenyl and at least 90% of the total number of R radicals are alkyl and in said copolymer the ratio of $R_3SiO_{1/2}$ units to $SiO_2$ units is between 0.6 and 0.9 inclusive and (b) from 95% to 30% by weight of a benzene soluble organosiloxane of at least 1,000,000 centistokes viscosity at 25° C., said organosiloxane having the general formula $R'_2SiO$ where R' is a monovalent hydrocarbon radical selected from the group consisting of methyl and phenyl and at least 90% of the total number of R' radicals are methyl to bind the layers of polytetrafluoroethylene and the mica flakes into a whole.

2. A flexible electrically insulating material comprising a layer of polytetrafluoroethylene, a layer of mica flakes disposed thereon, and a flexible bonding agent binding the layer of polytetrafluoroethylene and the mica flakes into a whole, said bonding agent comprising a polysiloxane material composed essentially of (a) from 5% to 70% by weight of a benzene soluble resin copolymer composed essentially of structural units of $SiO_2$ and $R_3SiO_{1/2}$ where R is a monovalent hydrocarbon selected from the group consisting of alkyl radicals of less than 4 carbon atoms and phenyl and at least 90% of the total number of R radicals are alkyl and in said copolymer the ratio of $R_3SiO_{1/2}$ units to $SiO_2$ units is between 0.6 and 0.9 inclusive and (b) from 95% to 30% by weight of a benzene soluble organosiloxane of at least 1,000,000 centistokes viscosity of 25° C., said organosiloxane having the general formula $R'_2SiO$ where R' is a monovalent hydrocarbon radical selected from the group consisting of methyl and phenyl and at least 90% of the total number of R' radicals are methyl.

3. A flexible electrically insulating material comprising two superimposed layers of polytetrafluoroethylene, a layer of mica flakes disposed between the two layers of polytetrafluoroethylene, and a flexible bonding agent comprising a polysiloxane material composed essentially of (a) 5 to 70 percent by weight of a benzene soluble resin copolymer composed essentially of structural units of $SiO_2$ and $(CH_3)_3SiO_{1/2}$ and in said copolymer the ratio of $(CH_3)_3SiO_{1/2}$ units to $SiO_2$ units is between 0.6 to 0.9 inclusive and (b) 95 to 30 percent by weight of a benzene soluble organosiloxane of at least 1,000,000 centistokes at 25° C. and said organosiloxane having the general formula $R'_2SiO$ where R' is a monovalent hydrocarbon radical selected from the group consisting of methyl and phenyl and at least 90 percent of the total number of R' radicals are methyl to bind the layers of polytetrafluoroethylene and the mica flakes into a whole.

4. A flexible electrically insulating material comprising a layer of polytetrafluoroethylene, a layer of mica flakes disposed thereon, and a flexible bonding agent binding the layer of polytetrafluoroethylene and the mica flakes into a whole, said bonding agent comprising a polysiloxane material composed essentially of (a) 5 to 70 percent by weight of a benzene soluble resin copolymer composed essentially of structural units of $SiO_2$ and $(CH_3)_3SiO_{1/2}$ and in said copolymer the ratio of $(CH_3)_3SiO_2$ units is between 0.6 to 0.9 inclusive and (b) 95 to 30 percent by weight of a benzene soluble organosiloxane of at least 1,000,000 centistokes at 25° C. and said organosiloxane having the general formula $R'_2SiO$ where R' is a monovalent hydrocarbon radical selected from the group consisting of methyl and phenyl and at least 90 percent of the total number of R' radicals are methyl to bind the layers of polytetrafluoroethylene and the mica flakes into a whole.

References Cited in the file of this patent

UNITED STATES PATENTS

| | | |
|---|---|---|
| 2,392,388 | Joyce | Jan. 8, 1946 |
| 2,427,183 | Berry | Sept. 9, 1947 |
| 2,443,663 | Rider et al. | June 22, 1948 |
| 2,595,730 | Swiss et al. | May 6, 1952 |
| 2,736,721 | Dexter | Feb. 28, 1956 |
| 2,763,315 | Berberich et al. | Sept. 18, 1956 |
| 2,768,925 | Fay | Oct. 30, 1956 |